(12) United States Patent  
Von Watzdorf et al.

(10) Patent No.: US 10,118,645 B2
(45) Date of Patent: Nov. 6, 2018

(54) LONGITUDINAL BEAM MADE OF MULTI-LAYER STEEL

(71) Applicant: Benteler Automobiltechnik GmbH, Paderborn (DE)

(72) Inventors: Henning Von Watzdorf, Delbrueck (DE); Georg Frost, Steinheim (DE); Martin Schroeter, Paderborn (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 15/662,721

(22) Filed: Jul. 28, 2017

(65) Prior Publication Data

US 2018/0029645 A1  Feb. 1, 2018

(30) Foreign Application Priority Data

Jul. 29, 2016 (DE) .................. 10 2016 114 068

(51) Int. Cl.
| | |
|---|---|
| *B62D 21/15* | (2006.01) |
| *B21D 53/88* | (2006.01) |
| *B32B 15/01* | (2006.01) |
| *B62D 25/08* | (2006.01) |
| *B62D 29/00* | (2006.01) |
| *C22C 38/04* | (2006.01) |

(52) U.S. Cl.
CPC ........... *B62D 21/152* (2013.01); *B21D 53/88* (2013.01); *B32B 15/01* (2013.01); *B32B 15/011* (2013.01); *B62D 25/082* (2013.01); *B62D 29/007* (2013.01); *B32B 2605/00* (2013.01); *C22C 38/04* (2013.01)

(58) Field of Classification Search
CPC ...... B62D 21/152; B62D 29/007; B32B 15/01
USPC ....................................... 296/187.09, 203.02
See application file for complete search history.

(56) References Cited

U.S. PATENT DOCUMENTS

| | | | |
|---|---|---|---|
| 8,454,079 B2 * | 6/2013 | Yoshida | B21D 7/08 |
| | | | 296/187.09 |
| 9,211,913 B2 * | 12/2015 | Ohta | B62D 21/152 |
| 2007/0107819 A1 | 5/2007 | Gehringhoff et al. | |

(Continued)

FOREIGN PATENT DOCUMENTS

| | | |
|---|---|---|
| DE | 102005054847 B3 | 10/2007 |
| DE | 102014008718 B3 | 2/2015 |
| DE | 102014114365 A1 | 4/2016 |

OTHER PUBLICATIONS

German Office Action, Application No. 10 2016 114 068.6, dated Apr. 25, 2017, 10 pp.

*Primary Examiner* — Joseph D. Pape
(74) *Attorney, Agent, or Firm* — Hauptman Ham, LLP

(57) ABSTRACT

The present invention relates to a longitudinal beam for a motor vehicle, having a body, of hollow cross section and extending in the longitudinal direction, with a front connection for a cross-member and a rear connection to a motor vehicle body, said longitudinal beam being characterized in that the longitudinal beam is produced from a multi-layer steel having a homogeneous wall thickness as a hot-formed and press-hardened component and has at least one reinforcement patch, wherein the multi-layer steel has a central layer and at least one outer layer made of a ferritic stainless steel alloy.

17 Claims, 4 Drawing Sheets

(56) References Cited

U.S. PATENT DOCUMENTS

2015/0367597 A1 12/2015 Hilfrich et al.
2017/0297304 A1 10/2017 Becker

* cited by examiner

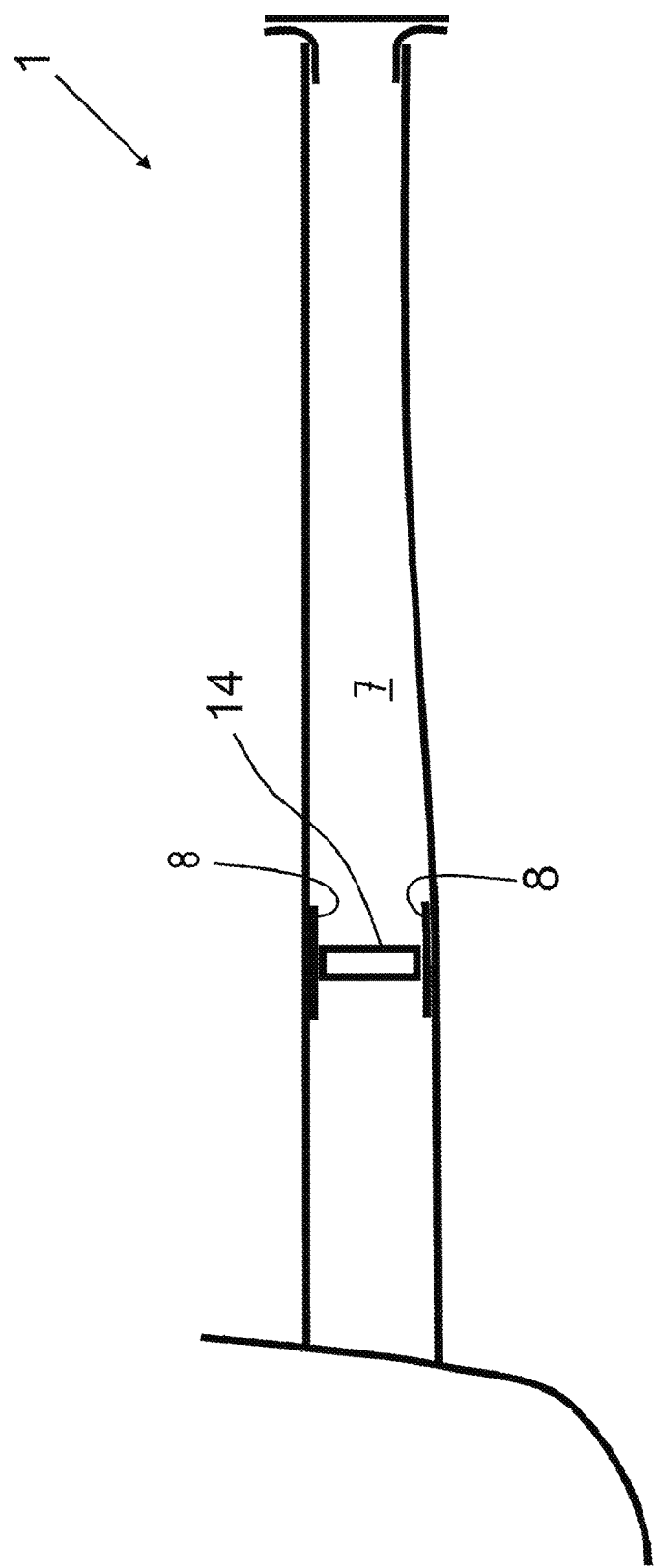

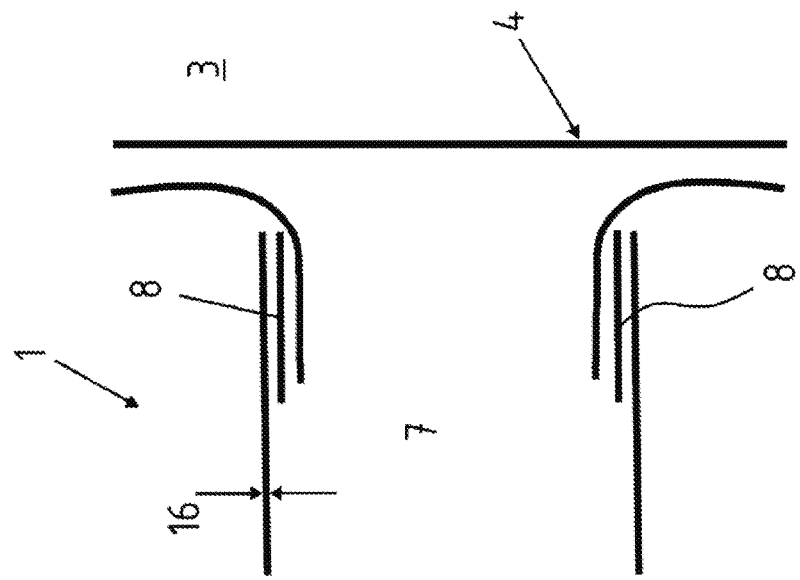
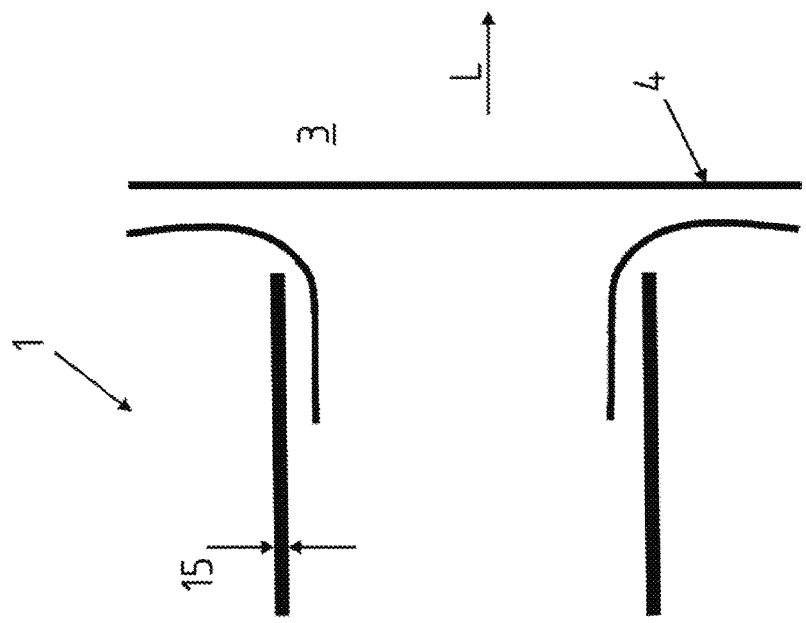

LONGITUDINAL BEAM MADE OF MULTI-LAYER STEEL

RELATED APPLICATIONS

The present application claims the priority from German Application Number 10 2016 114 068.6, filed Jul. 29, 2016, the disclosure of which is hereby incorporated by reference herein in its entirety.

BACKGROUND

1. Field of the Invention

The disclosure is related to a vehicle component, and more specifically, to a longitudinal beam for a motor vehicle.

2. Description of the Related Art

Longitudinal beams are installed in motor vehicles mostly in the front region. They connect the motor vehicle body from an A-pillar or splash guard wall as far as the front crash management system. The crash management system has a cross-member and crash boxes. The crash boxes are coupled to the front ends of the longitudinal beams. The longitudinal beams furthermore have a corresponding connection region or engine mount, in order to accommodate a drive motor, a gear mechanism and/or an axle subframe in the front-end region.

Various demands are made on the longitudinal beam. Firstly, the longitudinal beam has to have a low dead weight and also favorable production costs. Furthermore, the longitudinal beam should have a corrosion-resistant form.

Furthermore, the longitudinal beams are subject to the demand for a high component rigidity, such as to ensure that assemblies and connections are fastened in a safe manner with respect to crashes and that the crash management system is supported.

At the same time, particularly in the case of a high-speed crash, a longitudinal beam should deform in a targeted manner in the longitudinal direction thereof, in order to thereby dissipate crash energy through deformation work.

It is known from the prior art to produce longitudinal beams made of a hot-formed and press-hardened manganese-boron steel. Following the hot-forming and press-hardening process, said steel is partially heat-treated or else partially tempered. In order to set ductile regions in a targeted manner, it is also possible to carry out partial hot forming and press hardening. Furthermore, it is known to produce cross-members from partially rolled metal sheets, what are termed tailored rolled blanks. The production costs for the blank are already high, however. It is also known to produce longitudinal beams from tailored welded blanks. Here, too, the production of the corresponding longitudinal beams is associated with high costs.

DE 10 2014 114 365 A1 discloses a multi-layer steel, in which a high-strength steel is provided as the core layer and the multi-layer steel is used for the production of a vehicle longitudinal beam.

DE 10 2014 008 718 B3 discloses a tailored blank as a semi-finished product for motor vehicle components which consists of a first blank made of a high-strength steel and a second blank made of a multi-layer steel.

Furthermore, DE 10 2005 054 847 B3 discloses a longitudinal beam made of high-strength steel, in which a targeted local heat treatment is provided for forming deformation zones. It is therefore an object of the present invention to provide a longitudinal beam which, compared to manufacturing methods known from the prior art, has a low dead weight optimized in relation to a crash and also good anti-corrosion properties and at the same time can be produced cost-effectively for mass production.

SUMMARY

According to one exemplary embodiment, the longitudinal beam for a motor vehicle has a body, extending in the longitudinal direction, with a front connection region for a cross-member and a rear connection region to a motor vehicle body. According to the disclosure, the longitudinal beam is produced from a multi-layer steel as a hot-formed and press-hardened component having a homogeneous wall thickness and has at least one reinforcement patch.

A multi-layer steel is preferably a two-layered, in particular a three-layered, steel. At least one layer, in particular the central layer, is formed from a hardenable manganese-boron steel, which, during the hot forming, i.e. heating to above AC3 temperature, has high degrees of shaping freedom, with a strength, in particular a tensile strength, of more than 1000 MPa being set in a subsequent press-hardening process.

In order that good anti-corrosion properties are achieved at the same time, at least one outer layer is, in particular both outer layers are, formed from a stainless ferritic steel alloy. Good protection against corrosion and against stone chips is therefore provided on at least one side. If the stainless ferritic steel alloy is arranged on both outer sides, i.e. in each case as an outer layer, the central layer located therebetween is protected against corrosion resulting from weathering influences, for example caused by thawing salt during winter operation. The individual layers are coupled to one another in an integral and areal manner. This coupling is already effected during the provision of a sheet metal strip or of a blank made of multi-layer steel. By way of example, the coupling can be established by roll cladding.

According to one exemplary embodiment, the longitudinal beam has a homogeneous, i.e. a constant, wall thickness. Any reductions in wall thickness, caused by instances of thinning or the like during the forming process, are regarded as an identical or homogeneous wall thickness for the purposes of this disclosure. A reinforcement patch is arranged in those regions in which, for example, deformation is to be avoided and/or higher rigidities are required. Therefore, a plurality of reinforcement patches may be arranged on the longitudinal beam.

The longitudinal beam itself is formed as a profiled component of hollow cross section. It is preferable for the body of the longitudinal beam to be formed as a profiled component of hat-shaped cross section. The cross section may then be open. The cross section can also have a closed form, however. In the case of a cross section of closed form, provision is made in particular of a closing plate, or the longitudinal beam can also be formed by two shell components which are joined together to form a closed cross section.

In particular, it is therefore possible to provide a longitudinal beam having a tensile strength of greater than 1350 MPa, preferably of greater than 1500 MPa, and in particular of greater than 1750 MPa. In technical terms, it would be possible to set a tensile strength of up to 2500 MPa.

In those regions in which the reinforcement patch is applied on or to the longitudinal beam, it rests on the latter over its entire surface area. In particular, the reinforcement patch is arranged on an inner side, therefore in the hollow space, of the longitudinal beam. For this purpose, the reinforcement patch itself can be formed from a hardened steel alloy. As an alternative or optionally in addition, it is possible for the reinforcement patch to also be formed from a multi-layer steel. It is preferable here to use a two-layered steel, which, on one outer side, has a likewise ferritic stainless outer layer, and a layer correspondingly lying thereunder, which preferably is also formed from a hot-formable and press-hardenable manganese-boron steel. That side of the layer of manganese-boron steel which is not protected against corrosion by an outer layer rests on the longitudinal beam over its entire surface area.

A joining means, for example an adhesive or else a solder, can provide a full-surface-area, integral and also optionally at the same time corrosion-inhibiting coupling to the longitudinal beam. It is also possible for the reinforcement patch to be formed from a three-layer steel, with a respective outer layer made of a ferritic stainless steel alloy. Alternatively, it is also possible for the reinforcement patch to be formed from a fiber composite material. The matrix resin of the fiber composite material can then preferably serve here as coupling means to the multi-layer steel.

At least in the case of press-hardenable steel for the reinforcement patch, the reinforcement patch can be produced together with the longitudinal beam by hot forming and press hardening. Alternatively, it is possible for the reinforcement patch to be coupled to the longitudinal beam after the latter has been produced, therefore after the conclusion of the press-hardening process.

It is particularly preferable for a reinforcement patch to be arranged in a rear region in the connection to the motor vehicle body or to the splash guard wall of the motor vehicle. In particular in the case of a crash with a high intensity, it is therefore possible to prevent the longitudinal beam from being torn off.

It is also preferable for the reinforcement patch to be arranged in a front region in the connection to the cross-member. Here, too, tearing-off by an impact with a high intensity is prevented.

Furthermore, it is preferable that a reinforcement patch can be arranged in a central region. Here, provision is mostly made of a connection point in order to provide an engine mount and/or a possibility to fasten an axle subframe.

Preferably, the natural oscillation behavior of the front end can be influenced by a targeted application of one or more reinforcement patches.

Moreover, at least in those surface regions which are not reinforced by the reinforcement patch, the longitudinal beam has a bending angle of greater than 70° (degrees) after the press-hardening. The bending angle can be determined in a plate bending test in accordance with German Association of the Automotive Industry standard VDA 238-100:2010, to the contents of which reference is hereby made. The bending angle in the case of the longitudinal beam according to the invention is dependent on thickness. In the case of a wall thickness of the longitudinal beam of between 1.0 and 1.5 millimeters (mm), said bending angle is, for example, greater than 80 degrees; in the case of a wall thickness of between 1.6 and 2.0 mm, the bending angle is preferably greater than 75 degrees; and in the case of a wall thickness of between 2.1 and approximately 3 mm, said bending angle is greater than 70 degrees.

The bending angle of greater than 70 degrees brings about an outstanding deformation behavior of the longitudinal beam in the case of an impact, as a result of which firstly tearing-off and also kinking are prevented. Compared to other hardened, in particular form-hardened, components of similar tensile strength, it is possible according to the invention to dispense both with locally different heating or locally different tool cooling during the press hardening, and also with a subsequent heat treatment for softening the completely hardened motor vehicle component. It is therefore also possible for the tensile strength to be set homogeneously above 1350 MPa, and therefore the wall thickness of the longitudinal beam can be reduced to a maximum extent. For the purposes of the invention, the longitudinal beam is therefore hardened homogeneously in all surface portions, with a tensile strength of at least 1350 MPa, and does not have any unhardened or incompletely hardened portions, with the exception of softer zones which are unavoidable for joining reasons. These unavoidable zones may be heat-affected zones resulting from thermal joining methods such as spot welding or hole welding, but also trimming edges or hole edges caused by a laser beam.

Steel alloys which are suitable according to the invention for the central layer of the longitudinal beam are boron steels with the main alloying elements carbon and manganese, for example 22MnB5, 38MnB5.

According to one exemplary embodiment, the outer layer of the longitudinal beam consists of a ferritic stainless steel alloy, wherein the outer layer is connected to the central layer in an areal and integral manner. It is preferable for two outer layers to be connected to the central layer. In this case, the outer layers and the central layer are already connected before the shaping in the form of a strip, for example by common hot rolling to form a sheet metal material. By virtue of the reduced carbon content of the ferritic stainless steel alloy, the outer layer brings about a significantly increased bending angle of the sheet metal material, or of the longitudinal beam, in the form-hardened state, and moreover an outstanding corrosion resistance, even to crevice corrosion or contact corrosion. Furthermore, in relation to usable ferritic stainless steel alloys, reference is hereby made to the contents of EN 10088-1, with chromium contents depending on the grade of between 10.5 to 30 percent by weight.

Weldability is ensured by stabilization additives of less than 0.5 percent by weight of titanium, niobium and/or zirconium, and also the carbon content limited to 0.16 percent by weight. The mass proportion of carbon in the outer layer is preferably between 0.03 and 0.16 percent by weight, with the outer layer having in each case a thickness of between 40 µm and 400 µm, in particular of between 80 and 250 µm.

Furthermore, it is possible for the central layer to have a martensitic material microstructure and a mass proportion of carbon of between 0.19 and 0.41 percent by weight. The longitudinal beam is preferably form-hardened and in particular has a tensile strength of at least 1350 MPa. A yet lighter component with yet thinner walls can thereby be produced by the simultaneously ensured bending angle of more than 70 degrees. In this respect, it has proved to be advantageous to use a hardenable steel alloy which, in addition to impurities resulting from the melting process and iron, comprises the following constituents, in percent by weight:

| | |
|---|---|
| carbon | 0.35 to 0.41 |
| silicon | 0.1 to 1.0 |
| manganese | 1.0 to 1.5 |
| phosphorus | <0.04 |
| sulfur | <0.02 |
| aluminum | <0.10 |
| chromium | <0.35 |
| titanium | <0.050 |
| boron | 0.0010 to 0.0055. |

The cooling rate, which, in the cited temperature range, is on average at least 27 K/s, preferably at least 40 K/s, most preferably between 50 and 150 K/s, brings about sufficient hardening of the steel alloy of the longitudinal beam, but at the same time achieves a surprisingly large bending angle. Complex and error-prone process steps which are otherwise normally required for this strength class of form-hardened or press-hardened components, such as locally different heating or cooling or even subsequent tempering, for example for achieving coupling portions insensitive to cracking or a specific deformation behavior in the installed state of the longitudinal beam according to the invention, are avoided on account of the bending angle of greater than 70 degrees.

A method for producing the longitudinal beam is distinguished by the following steps:
- providing a sheet metal blank made of a sheet metal material, having a central layer made of a hardenable steel alloy and at least one outer layer made of a ferritic stainless steel alloy, wherein the outer layer is connected to the central layer in an areal and integral manner,
- optionally preforming the sheet metal blank,
- complete heating for the purposes of austenitization to above 900° C.,
- forming the heated sheet metal blank and also the auxiliary element, in particular together in a press-forming tool,
- press hardening in the press-forming tool, wherein, during the press hardening of the longitudinal beam, cooling is effected from a temperature of greater than 850° C. to a temperature of less than 250° C. at a cooling rate of greater than 27 Kelvin per second, as a result of which a bending angle of greater than 70 degrees and a tensile strength of at least 1350 Megapascals are set in the longitudinal beam.

The cooling rate, which, in the cited temperature range, is on average at least 27 K/s, preferably at least 40 K/s, most preferably between 50 and 150 K/s, brings about sufficient hardening of the steel alloy of the longitudinal beam, but at the same time achieves a surprisingly large bending angle. Complex and error-prone process steps which are otherwise normally required for this strength class of form-hardened components, such as locally different heating or cooling or even subsequent tempering, for example for achieving coupling portions insensitive to cracking or a specific deformation behavior in the installed state of the longitudinal beam according to the invention, are avoided on account of the bending angle of greater than 70 degrees.

As already mentioned above, the longitudinal beam has the mechanical properties of the tensile strength of at least 1350 MPa and the bending angle of greater than 70 degrees substantially over its entire surface area. The method according to the invention provides an optimum simple process for producing longitudinal beams for the body of a motor vehicle with an improved crash performance and reduced weight. One particular advantage compared to partially differently form-hardened or locally softened pillars consists in the fact that the component does not have any thermally induced distortion, springback effects or internal stresses, does not have to be protected against scale formation and oxidation during heating and press hardening, and it is possible to dispense with a complex pretreatment or post-treatment for the application of corrosion protection.

BRIEF DESCRIPTION OF THE DRAWINGS

For an understanding of embodiments of the disclosure, reference is now made to the following description taken in conjunction with the accompanying drawings, in which:

FIG. 3 shows a longitudinal beam in a side view with a receptacle for an engine mount; and, FIGS. 4a and 4b show a front portion of a longitudinal beam according to the prior art and the invention.

Figure 1:
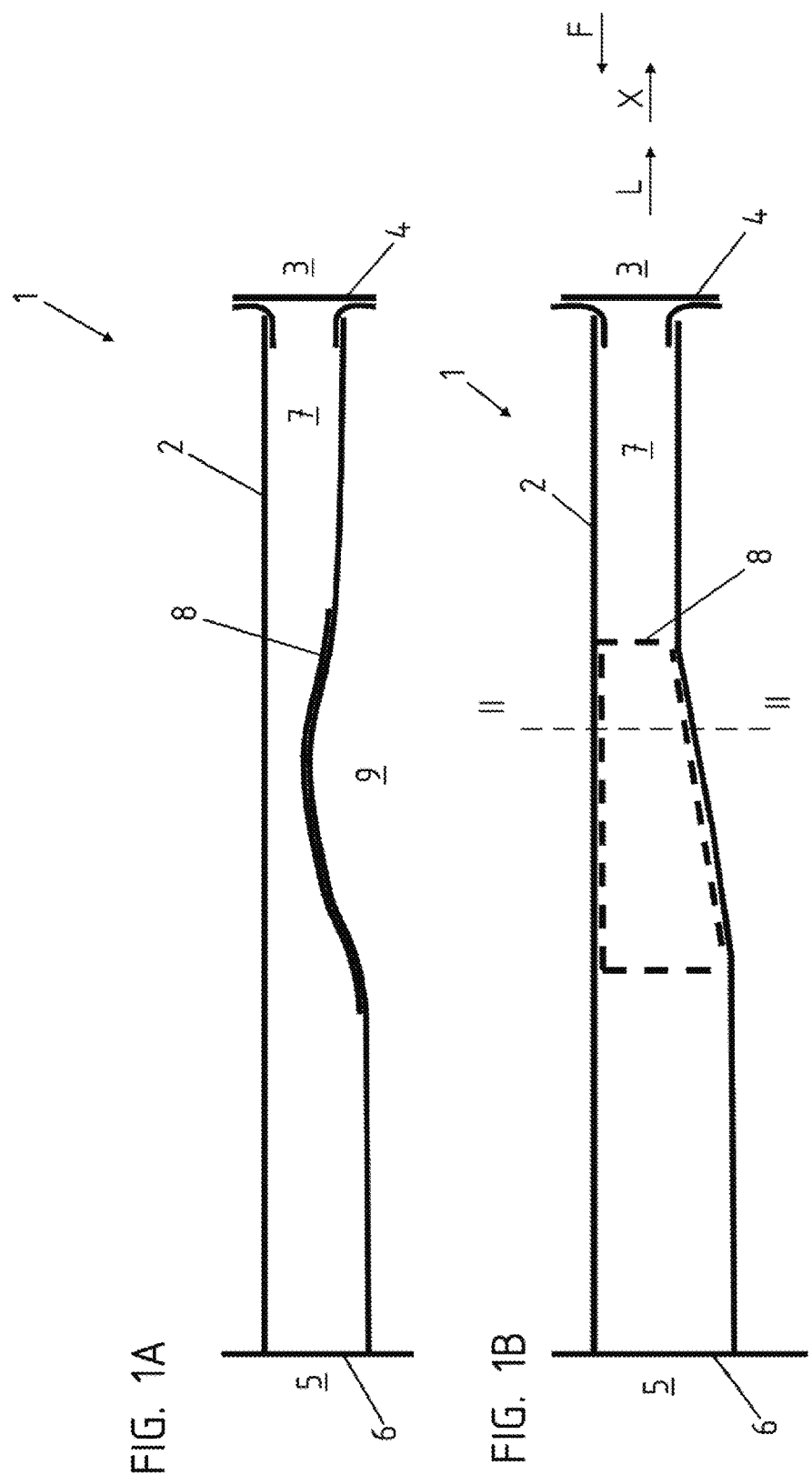
FIGS. 1a and 1b show a longitudinal beam according to the invention in a plan view and a side view.

In the figures, the same reference signs are used for identical or similar components, even if a repeated description is omitted for reasons of simplicity.

DETAILED DESCRIPTION OF SOME EMBODIMENTS

Some embodiments will be now described with reference to the Figures.

FIGS. 1a and b show the longitudinal beam 1 according to the one embodiment in a plan view as per FIG. 1a and a side view as per FIG. 1b. The longitudinal beam 1 has a hollow body 2 extending in the longitudinal direction L. The longitudinal direction L is also as it were oriented in the motor vehicle longitudinal direction X. A connection for a crash management system 4 is provided at a front end 3. The crash management system is formed, for example, by crash boxes (not shown in more detail) with a cross-member located thereon. A connection to a motor vehicle body (not shown in more detail) is provided at a rear end 5, for example on a splash guard wall or else in the region of an A-pillar. The hollow body 2 has an inner space 7. According to the invention, a reinforcement patch 8 is arranged in the inner space 7 and is coupled to the longitudinal beam 1. In the case of axial loading, therefore upon the introduction of a force F in the motor vehicle longitudinal direction X, the reinforcement patch 8 prevents premature or undirected kinking of the longitudinal beam 1 at a constriction 9. On account of the bending angle of greater than 70 degrees, the longitudinal beam 1 buckles so as to fold in a targeted manner and therefore dissipates crash energy.

Figure 2:
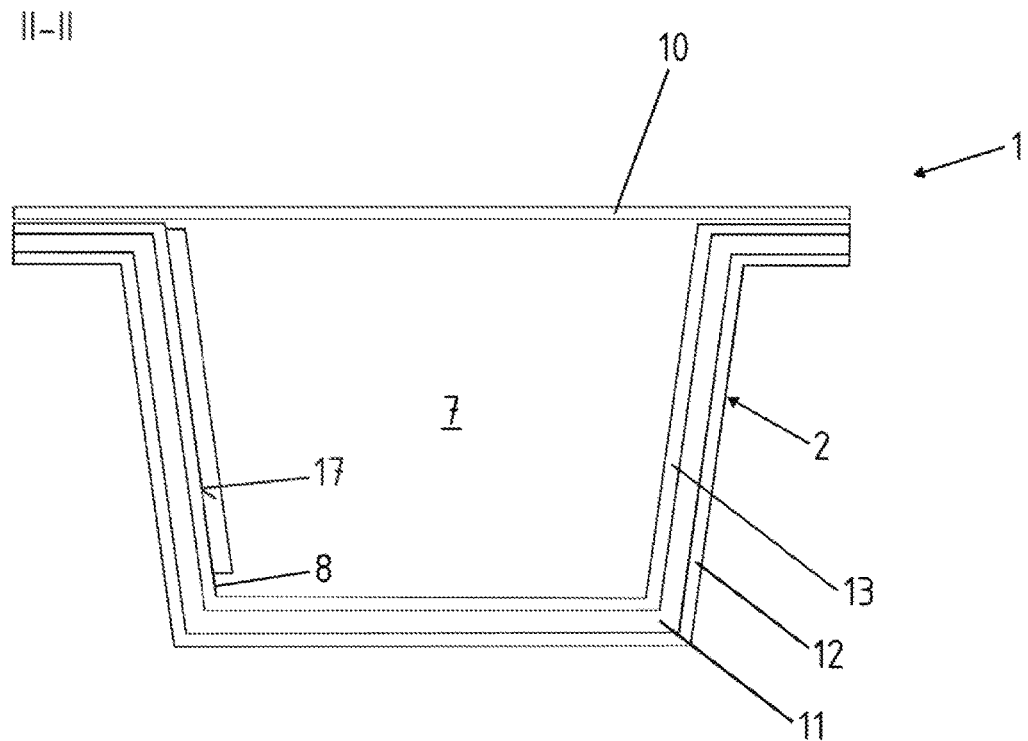
FIG. 2 shows a cross-sectional view in accordance with the line of intersection II-II from FIG. 1.

FIG. 2 shows the longitudinal beam 1 in cross section in accordance with the line of intersection II-II from FIG. 1b. The longitudinal beam 1 has a two-part form. In a bottom part, in relation to the plane of the image, there is located the hollow body 2, which is closed by a closing plate 10 with a cross section in the form of a closed hollow profile. The inner space 7 is formed. The reinforcement patch 8 is arranged in the inner space 7 and is coupled to the inner lateral surface of the body 2. The body 2 itself is formed from a three-layered multi-layer steel. A central layer 11 is formed from a hardened manganese-boron steel, for example 22MnB5. Two outer layers 12, 13 which enclose the central layer 11 are formed from a ferritic stainless steel alloy, also referred to as high-grade steel. The outer layers 12, 13 are preferably formed from a ferritic stainless steel alloy. This not only provides a very good anti-corrosion property, but at the same time also protects the central layer 11 against stone chips. The closing plate 10 can have a single-layer form. However, the closing plate 10 can also be formed from a multi-layer steel alloy, for example also from a three-layered steel alloy. The reinforcement patch 8 can have a single-layer form or else can be formed from a multi-layer steel.

The reinforcement patch 8 can be coupled to the body 2 by thermal joining. It is preferable for the reinforcement patch 8 to be coupled in a manner resting over its entire surface area. In particular, use is made of adhesive bonding or else soldering. A spot weld or else a weld encircling the outside of a hole weld could also be produced by means of thermal joining.

FIG. 3 shows a further side view of a longitudinal beam 1 according to the invention. Here, two reinforcement patches 8 are arranged in the region of a bearing connection 14, for example for an engine mount. As shown in FIGS. 1a to 2, the reinforcement patches 8 may already have been coupled to a blank for forming the longitudinal beam 1 before the hot forming and press hardening, or may be substantially coupled thereto.

FIGS. 4a and 4b show a front end 3 of a longitudinal beam 1 according to the invention as per FIG. 4b and of a longitudinal beam 1 known from the prior art as per FIG. 4a. As shown in FIG. 4a, the longitudinal beam 1 has a greater wall thickness 15 at its front end 3.

By comparison, the wall thickness 16 of the longitudinal beam 1 produced according to the invention is smaller. A reinforcement patch 8 is arranged in each case on an inner side in the inner space 7 between the connection 4 for a crash management system (not shown in more detail) and the longitudinal beam 1. The longitudinal beam 1 produced according to the invention therefore has a weight-optimized form with a thinner wall thickness 16, and has a high strength and at the same time a good ductility. An adequate crash performance of the longitudinal beam 1 is provided by the local reinforcement in required regions.

The foregoing description of some embodiments of the invention has been presented for purposes of illustration and description. It is not intended to be exhaustive or to limit the invention to the precise form disclosed, and modifications and variations are possible in light of the above teachings or may be acquired from practice of the invention. The specifically described embodiments explain the principles and practical applications to enable one ordinarily skilled in the art to utilize various embodiments and with various modifications as are suited to the particular use contemplated. It is intended that the scope of the invention be defined by the claims appended hereto, and their equivalents. Further, it should be understood that various changes, substitutions and alterations can be made hereto without departing from the spirit and scope of the invention as described by the appended claims.

The invention claimed is:

1. A longitudinal beam for a motor vehicle, said motor vehicle having a body, said longitudinal beam having a hollow cross section and extending in the longitudinal direction, with a front connection for a cross-member and a rear connection to a motor vehicle body, wherein the longitudinal beam is produced from a multi-layer steel having a homogeneous wall thickness as a hot-formed and press-hardened component, wherein the longitudinal beam includes at least one reinforcement patch, and wherein the multi-layer steel has a central layer and also at least one outer layer made of a ferritic stainless steel alloy.

2. The longitudinal beam according to claim 1, wherein the longitudinal beam has a hollow body which has an open cross section, and
the longitudinal beam has a closed cross section.

3. The longitudinal beam according to claim 2, wherein the closed cross section is formed by a closing plate closing the hollow body.

4. The longitudinal beam according to claim 1, wherein the central layer is formed from a hardened steel alloy, the at least one outer layer comprises two outer layers made of a stainless ferritic steel alloy and arranged on opposite sides of the central layer, respectively, and the two outer layers are coupled to the central layer in an integral and areal manner.

5. The longitudinal beam according to claim 1, wherein the longitudinal beam has a tensile strength of greater than 1350 MPa.

6. The longitudinal beam according to claim 1, wherein the at least one reinforcement patch rests on the longitudinal beam over an entire surface area of the at least one reinforcement patch.

7. The longitudinal beam according to claim 1, wherein the at least one reinforcement patch is formed from a hardened steel alloy and/or from a multi-layer steel, or the at least one reinforcement patch is formed from a fiber composite material.

8. The longitudinal beam according to claim 1, wherein the at least one reinforcement patch is hot-formed and press-hardened together with the longitudinal beam, or the at least one reinforcement patch is coupled to the longitudinal beam after the hot forming and press hardening.

9. The longitudinal beam according to claim 1, wherein the at least one reinforcement patch is arranged in an inner space of the longitudinal beam.

10. The longitudinal beam according to claim 1, wherein the at least one reinforcement patch is arranged in a front region of the connection to the cross-member.

11. The longitudinal beam according to claim 1, wherein the at least one reinforcement patch is arranged in a rear region at the connection to the motor vehicle body.

12. The longitudinal beam according to claim 1, wherein a connection for coupling to an assembly or an engine mount is arranged in a central length portion of the longitudinal beam, wherein the at least one reinforcement patch is arranged in the longitudinal beam in the region of the connection.

13. The longitudinal beam according to claim 1, wherein the longitudinal beam has a bending angle of greater than 70 degrees after the press-hardening at least in unreinforced surface regions.

14. The longitudinal beam according to claim 1, wherein the longitudinal beam is not tempered and/or does not have any surface regions with a relatively soft material microstructure.

15. The longitudinal beam according to claim 5, wherein the tensile strength of greater than 1350 MPa comprises a tensile strength of greater than 1500 MPa.

16. The longitudinal beam according to claim 5, wherein the tensile strength of greater than 1350 MPa comprises a tensile strength of greater than 1750 MPa.

17. The longitudinal beam according to claim 4, wherein the hardened steel alloy comprises a boron-manganese steel alloy.

* * * * *